(12) United States Patent
Burgess et al.

(10) Patent No.: US 11,985,398 B2
(45) Date of Patent: May 14, 2024

(54) CAMERA-BASED, PRIVACY LED TAMPER DETECTION

(71) Applicant: Meta Platforms Technologies, LLC, Menlo Park, CA (US)

(72) Inventors: Kirk Erik Burgess, Newark, CA (US); Kevin Sawyer, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 73 days.

(21) Appl. No.: 17/898,130

(22) Filed: Aug. 29, 2022

(65) Prior Publication Data

US 2023/0156313 A1    May 18, 2023

Related U.S. Application Data

(60) Provisional application No. 63/310,525, filed on Feb. 15, 2022, provisional application No. 63/279,557, filed on Nov. 15, 2021.

(51) Int. Cl.
| | |
|---|---|
| *H04N 23/50* | (2023.01) |
| *H04N 5/77* | (2006.01) |
| *H04N 5/91* | (2006.01) |
| *H04N 23/55* | (2023.01) |
| *H04N 23/56* | (2023.01) |
| *H04N 23/60* | (2023.01) |
| *H04N 23/61* | (2023.01) |

(52) U.S. Cl.
CPC ............... *H04N 23/50* (2023.01); *H04N 5/77* (2013.01); *H04N 5/91* (2013.01); *H04N 23/55* (2023.01); *H04N 23/56* (2023.01); *H04N 23/61* (2023.01); *H04N 23/64* (2023.01)

(58) Field of Classification Search
CPC ............ H04N 5/77; H04N 5/91; H04N 23/50; H04N 23/55; H04N 23/56; H04N 23/61; H04N 23/64
See application file for complete search history.

(56) References Cited

U.S. PATENT DOCUMENTS

| | | | |
|---|---|---|---|
| 10,623,628 B2 | 4/2020 | Hanover | |
| 2018/0115688 A1* | 4/2018 | Lin | ........................ G02B 7/34 |
| 2021/0191133 A1 | 6/2021 | Schwab et al. | |

OTHER PUBLICATIONS

EPO—International Search Report and Written Opinion for International Application No. PCT/US2022/049817, dated Feb. 28, 2023, 7 Pages.

* cited by examiner

*Primary Examiner* — Lin Ye
*Assistant Examiner* — Chriss S Yoder, III
(74) *Attorney, Agent, or Firm* — McDermott Will & Emery LLP (57) ABSTRACT

A system for recording video in a wearable device is provided. The system includes: a barrel to provide mechanical support for one or more components in the system, a camera, disposed inside the barrel, wherein the camera includes a front lens with a field of view pointed to an onlooker outside of the wearable device, a cover glass mounted on the barrel, the cover glass configured to protect the front lens and one or more components in the system, a light emitting device, disposed inside the barrel, and a light pipe configured to receive a light from the light emitting device and to transmit the light through an overlap area on the cover glass and to the onlooker, when the camera is recording a scene outside of the wearable device, within the field of view, wherein the camera field of view comprises at least a portion of the overlap area.

20 Claims, 6 Drawing Sheets

CAMERA-BASED, PRIVACY LED TAMPER DETECTION

CROSS-REFERENCE TO RELATED APPLICATIONS

The present disclosure is related to and claims priority under 35 USC § 119(e) to U.S. Provisional Appln. No. 63/279,557 filed on Nov. 15, 2021, and to U.S. Provisional Appln. No. 63/310,525, filed on Feb. 15, 2022, both entitled CAMERA-BASED PRIVACY LED TAMPER DETECTION, to Kirk E. BURGESS et-al., the contents of which applications are hereinafter incorporated by reference in their entirety, for all purposes.

BACKGROUND

Field

The present disclosure is related to systems for preventing tampering of privacy indicators of recording in wearable devices. More specifically, the present disclosure is directed to an optical system configured to detect tampering with light emitting diode (LED) recording indicators in smart glasses.

Related Art

The ability to record video and/or audio from wearable devices is an important feature for their implementation in immersive reality applications. To protect onlooker privacy, recording devices typically include alerting mechanisms such as red lights (or any other color) that are clearly visible to the onlooker and other people in the vicinity of the user of the recording device. However, there is no effective mechanism to prevent surreptitious tampering of the alerting mechanism by the user or some other actor. This has prevented the widespread use of video and/or audio recording devices in wearable devices, as the public remains weary of privacy violations.

SUMMARY

A system for recording video in a wearable device includes a barrel to provide mechanical support for one or more components in the system; a camera, disposed inside the barrel, wherein the camera includes a front lens with a camera field of view pointed to an onlooker outside of the wearable device a cover glass mounted on the barrel, the cover glass configured to protect the front lens and one or more components in the system; a first light emitting device, disposed inside the barrel; and a light pipe inside the barrel and configured to receive a light from the first light emitting device and to transmit the light through an overlap area on the cover glass and outside of the wearable device, to the onlooker, when the camera is recording a scene outside of the wearable device, within the camera field of view, wherein the camera field of view includes at least a portion of the overlap area.

A wearable device for use in immersive reality applications includes a camera for recording a video of an onlooker, the camera having a front lens with a camera field of view pointed to the onlooker, and a display to capture the video of the onlooker. The wearable device also includes a privacy indicator to provide a signal to the onlooker, the signal indicative that the video is being collected from the camera. The privacy indicator includes a barrel to provide mechanical support to the camera, a cover glass mounted on the barrel, the cover glass configured to protect the front lens of the camera and inside of the privacy indicator, a first light emitting device disposed inside the barrel, and a light pipe inside the barrel and configured to receive a light from the first light emitting device and to transmit the light through an overlap area on the cover glass and outside of the wearable device, to the onlooker. When the camera is recording a scene outside of the wearable device, within the camera field of view, wherein the camera field of view includes at least a portion of the overlap area. The wearable device also includes a processor configured to identify a blockage of the camera field of view within the portion of the overlap area, and to stop recording the video when the blockage of the camera field of view is identified.

In a third embodiment, a method for switching a hardware configuration of an enhanced reality headset includes identifying that a camera mounted on the wearable device is recording a scene, transmitting a light outside of the wearable device through a cover glass that protects a front lens of the camera, the light forming an overlap area with the field of view of the camera, on the cover glass, identifying, in an image captured by the camera, an obstruction of the overlap area, on the cover glass, and stopping the recording when the obstruction of the overlap area is identified.

These and other embodiments will be clear based on the following disclosure.

BRIEF DESCRIPTION OF THE DRAWINGS

In the figures, elements having the same or similar attributes and features are labeled with the same or similar reference labels, unless explicitly stated otherwise.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the figures herein, as follows.

In a world of head mounted cameras, privacy is on everyone's mind. The current implementations for privacy provide a simple solution for notifying individuals that a person is recording are mostly performed by using an LED which can easily be bypassed via damage or mechanical blockage (Cover LED). To prevent tampering, a capture camera as disclosed herein detects such unwanted events by placing a privacy indicator around a circumference of the camera's field of view (FOV).

Figure 1:
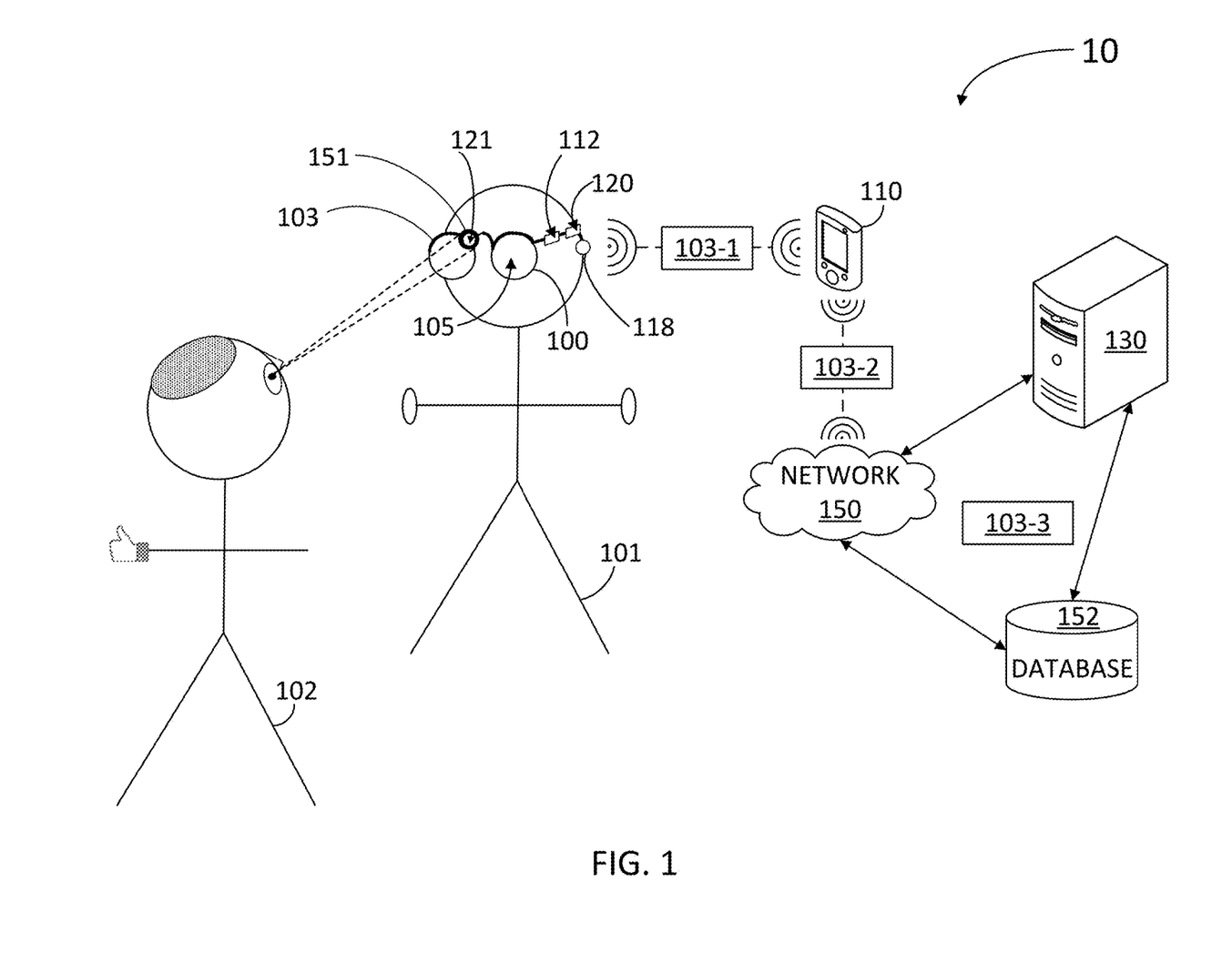
FIG. 1 illustrates a network architecture including a smart glass having a tamper-free, record indicating camera, according to some embodiments.

FIG. 1 illustrates a network architecture 10 including a smart glass 100 having a tamper-free, record indicating camera 121, according to some embodiments. Smart glass 100 includes a frame 103 and eyepieces 105 mounted thereon. Smart glass 100 also includes a processor 112 and a memory 120. Memory 120 stores instructions which, when executed by processor 112, cause smart glass 100 to perform at least partially one or more steps in methods consistent with the present disclosure. A communications module 118 enables smart glass 100 communication with a mobile device 110 (e.g., wirelessly), which may belong to user 101, and exchange a dataset 103-1. Communications module 118 may include radio-frequency (RF) hardware and software, such as antennas, filters, data acquisition converters (digital-to-analog and analog-to-digital), phase-locked loops, frequency converters, mixers, digital signal processing circuitry, and the like.

Mobile device 110 may be communicatively coupled with a remote server 130, through a network 150, and exchange dataset 103-2. Moreover, network architecture 10 may include a database 152 communicatively coupled with server 130 to exchange a dataset 103-3. Datasets 103-1, 103-2, and 103-3 will be collectively referred, hereinafter, as "datasets 103." Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

A user 101 of smart glass 100 is recording an onlooker 102. Camera 121 has a recording indicator 151 that is turned on, and onlooker 102 can clearly see it.

Figure 2:
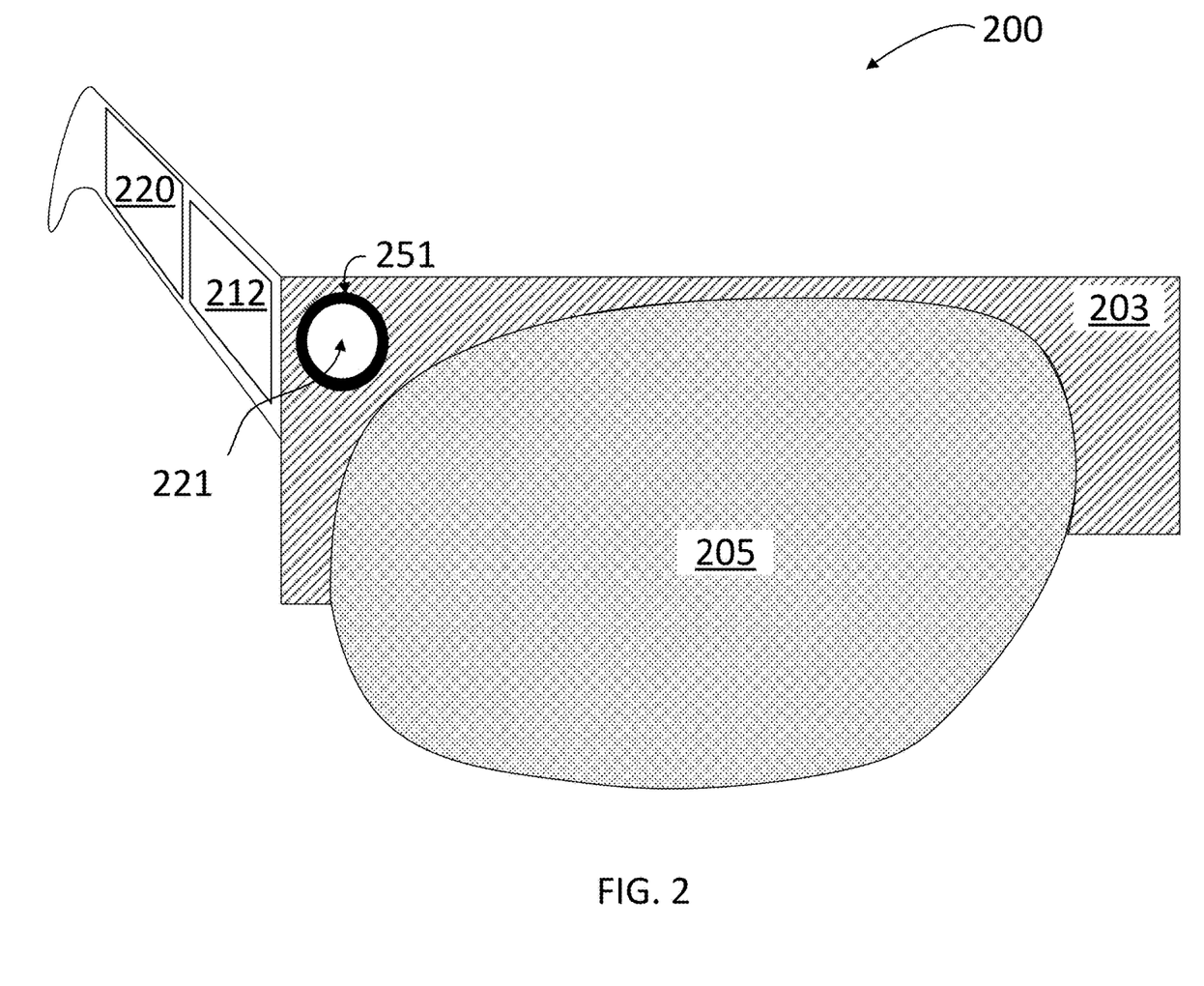
FIG. 2 illustrates a partial view of a smart glass including a tamper-free, record indicating camera, according to some embodiments.

FIG. 2 illustrates a partial view of a smart glass 200 including a tamper-free, record indicating camera 221, according to some embodiments. In some embodiments, smart glass 200 may be used in immersive reality applications. Smart glass 200 includes a frame 203, holding an eyepiece 205, and a camera 221 for recording a video of an onlooker (cf., onlooker 102). Camera 221 may include a front lens with a camera field of view (FOV) pointed to the onlooker, and a display to capture the video of the onlooker. A recording indicator 251 provides a signal to the onlooker, indicative that a video is being collected from the camera. Recording indicator 251 may include an overlap area with the camera FOV.

In some embodiments, smart glass 200 includes a memory 220 storing instructions, and a processor 212 configured to execute the instructions to perform at least some operations as described herein. For example, processor 212 may execute instructions in memory 220 to identify a blockage of a camera FOV within the recording indicator 251, and to stop recording the video when the blockage of the camera field of view is identified.

Figure 3A:
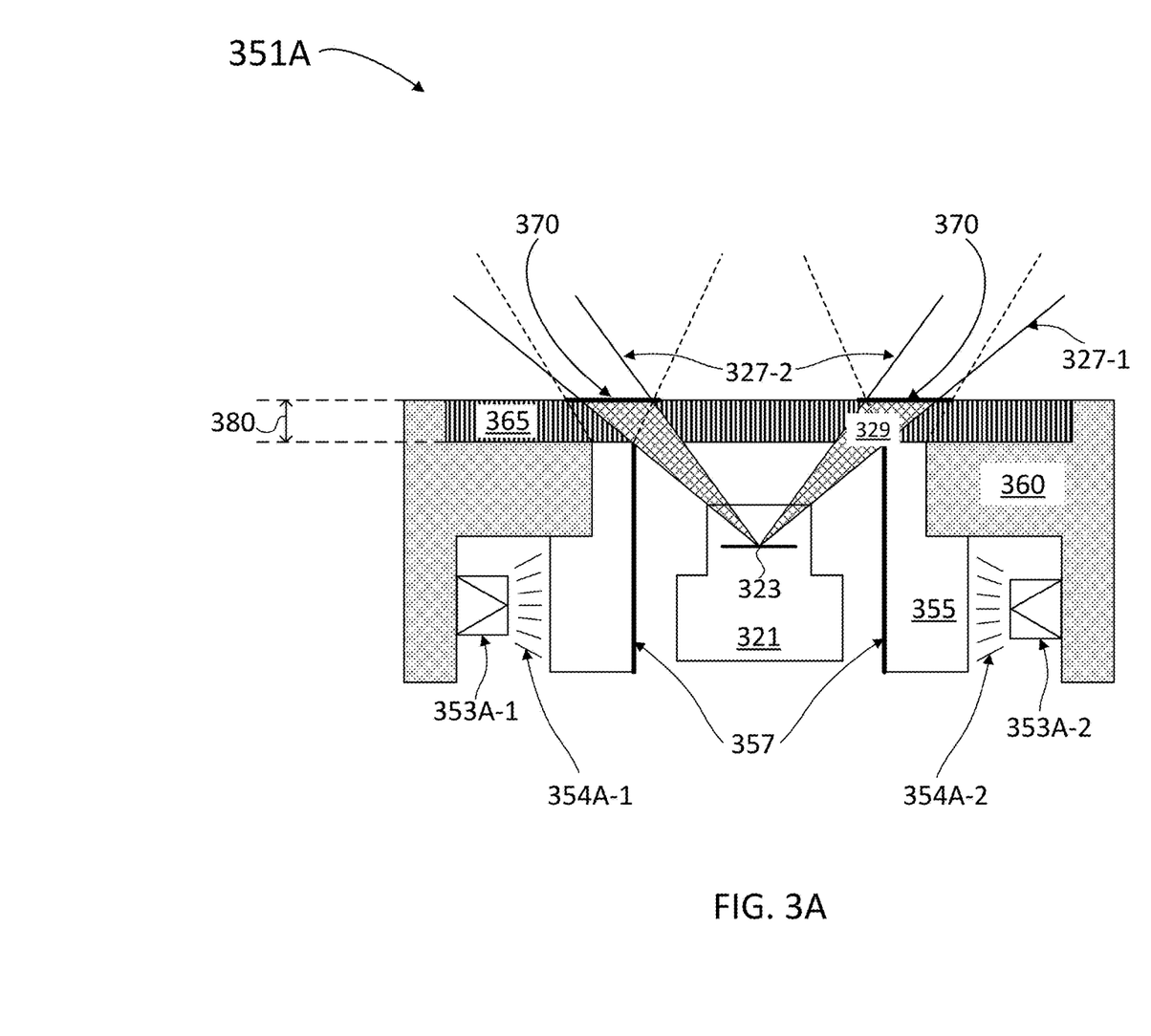
FIGS. 3A-3B illustrate tamper-free, recording indicators including multiple light sources and a single, circular light source, according to some embodiments.
Figure 3B:
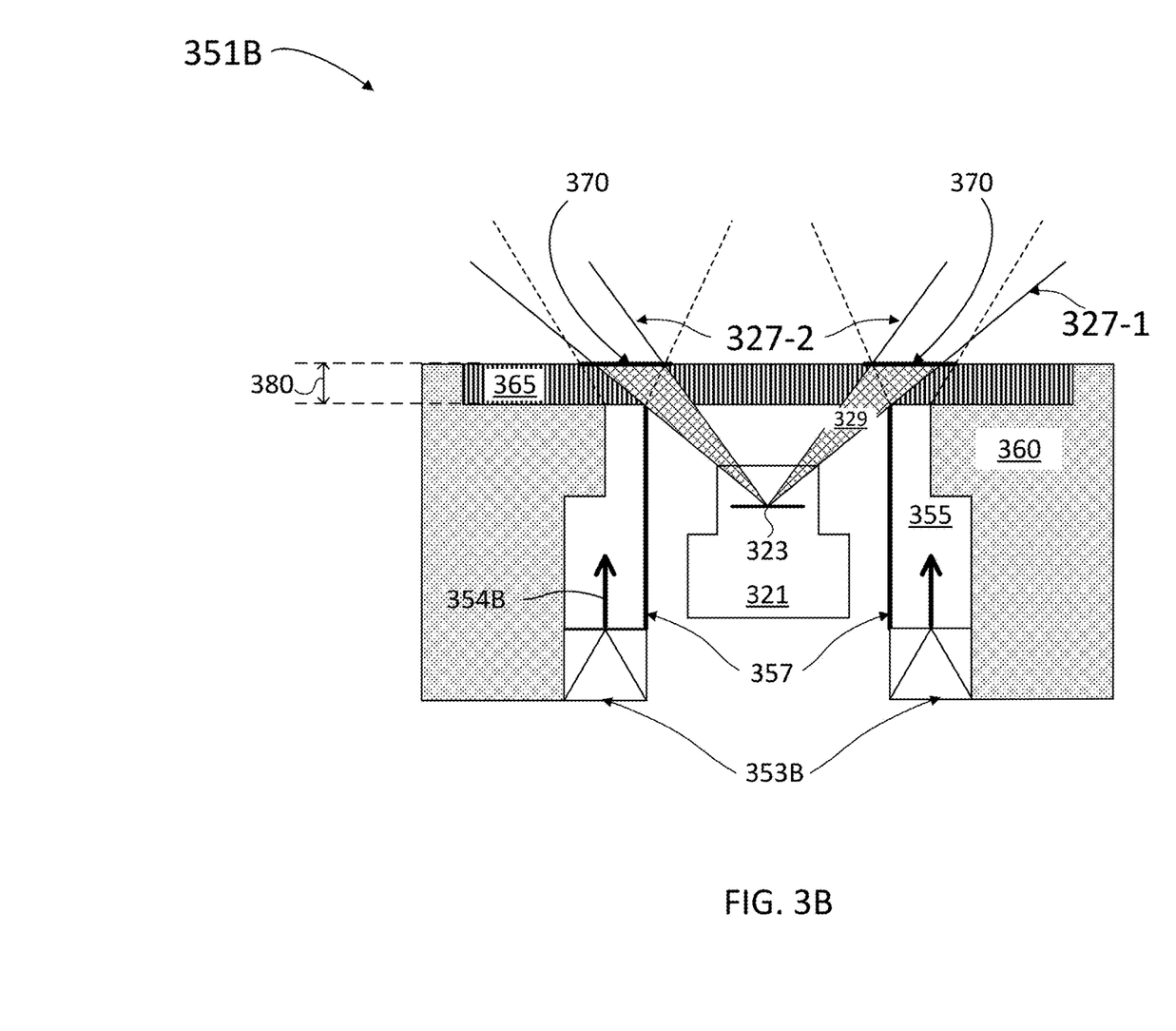

FIGS. 3A-3B illustrate tamper-free recording indicators 351A and 351B (hereinafter, collectively referred to as "recording indicators 351"), according to some embodiments. Recording indicator 351A includes multiple light sources or LEDs, 353A-1 and 353A-2 (hereinafter, collectively referred to as "light sources 353A"). Recording indicator 351B includes a single, circular light source or LED, 353B. A barrel 360 provides mechanical support for one or more components in the tamper-free camera 321. One or more LEDs 353A, or a single, circular light source 353B (hereinafter, collectively referred to as "light sources 353") may be disposed inside a barrel 360.

Light sources 353A may include LED 353A-1, having an overlap area 370 that partially crops FOV 327-1 of camera 321 (e.g., creating an image circle for an onlooker), leaving an effective FOV 327-2 for a scene image to be captured. This allows detection of a blockage 329 of LED 353A-1 (e.g., due to unwanted or unsolicited tampering with the device) which, without the appropriate size and placement would create detectable artifacts in the image, resulting in camera 321 being locked out until the blockage is rectified.

In some embodiments, barrel 360 has a cylindrical shape, and recording indicator 351A further includes a second light emitting device (LED 353A-2) disposed diametrically opposed to a first light emitting device (LED 353A-1), inside barrel 360. Camera 321, disposed inside barrel 360, includes a front lens with a camera field of view pointed to an onlooker outside of the wearable device. In some embodiments, camera 321 further includes a display 323 configured to capture the scene in FOV 327-1, and a processor (cf. processors 112 and 212) configured to identify blockage 329 of FOV 327-1, within overlap area 370. In some embodiments, the front lens is further configured to focus on the overlap area to identify a blockage of FOV 327-1. In some embodiments, a cover glass 365 is mounted on barrel 360, configured to protect a front lens of camera 321 and one or more components in recording indicator 351A. In some embodiments, cover glass 365 is coated to prevent a reflection of the light from LEDs 353A to enter FOV 327-1. In some embodiments, a light pipe 355 is inside barrel 360 to receive a light 354A-1 and 354A-2 (hereinafter, collectively referred to as "light 354A") from LEDs 353A. When camera 321 is recording a scene outside of the wearable device, light pipe 355 transmits light 354A through an overlap area 370 on cover glass 365 and outside of the wearable device, to the onlooker. Overlap area 370 is within FOV 327-1. In some embodiments, FOV 327-1 includes at least a portion of overlap area 370.

In some embodiments, light pipe 355 includes a surface 357 on a side adjacent to camera 321, coated to prevent light 354 from the light emitting devices 353 to enter FOV 327-1. In some embodiments, overlap area 370 has a size larger than a blockage detectability threshold, based on a thickness 380 of cover glass 365. As the figures illustrate, thickness 380 enables the formation of overlap area 370, which may be directly proportional to thickness 380.

In some embodiments, a processor (cf. processors 112 and 212) is configured to activate light emitting devices 353 when camera 321 starts recording a video of the onlooker. In some embodiments, processor 112 is configured to stop a video of the onlooker when a blockage of FOV 327-1 within overlap area 370 is identified. In some embodiments, a memory (cf. memory 120 and 220) stores instructions to cause the processor to identify, in an image collected by camera 321, a blockage of FOV 327-1, and to stop a video recording with camera 321 when the blockage of FOV 327-1 is identified.

Figure 4:
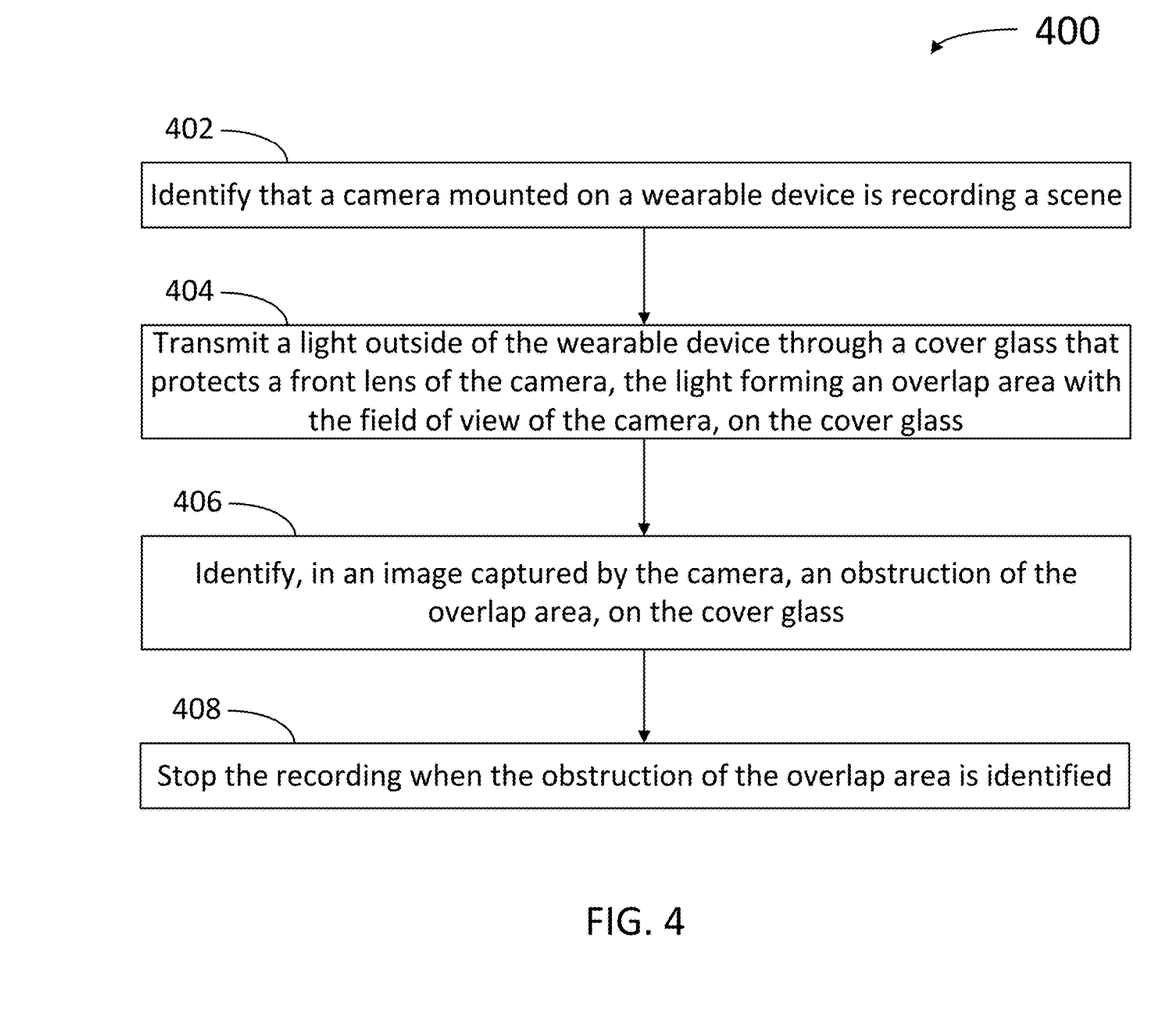
FIG. 4 illustrates steps in a method for detecting tamper with a privacy indicator in a recording by a wearable device, according to some embodiments.

FIG. 4 is a flowchart illustrating steps in a method 400 for detecting tamper with a privacy indicator in a recording by a wearable device, according to some embodiments. One or more of the steps in method 400 may be performed by a processor executing instructions stored in a memory of the wearable device (cf. processors 112 and 212, memories 120 and 220, and smart glasses 100 and 200). In some embodiments, a method consistent with the present disclosure may include one or more of the steps in method 400 performed in a different order, simultaneously, quasi-simultaneously, or overlapping in time.

Step 402 includes identifying that a camera mounted on the wearable device is recording a scene.

Step 404 includes transmitting a light outside of the wearable device through a cover glass that protects a front lens of the camera, the light forming an overlap area with the field of view of the camera, on the cover glass. In some embodiments, step 404 includes transmitting the light via a light pipe and through a cover glass protecting the camera. In some embodiments, step 404 includes transmitting the light through a portion of the cover glass that overlaps a peripheral portion of the field of view of the camera.

Step 406 includes identifying, in an image captured by the camera, an obstruction of the overlap area, on the cover glass. In some embodiments, step 406 includes inspecting the image for artifacts in an overlap area in the perimeter of the camera's field of view.

Step 408 includes stopping the recording when the obstruction of the overlap area is identified. In some embodiments, step 408 includes transmitting an alert signal to the user of the wearable device that an obstruction of the privacy indicator has been identified.

Hardware Overview

Figure 5:
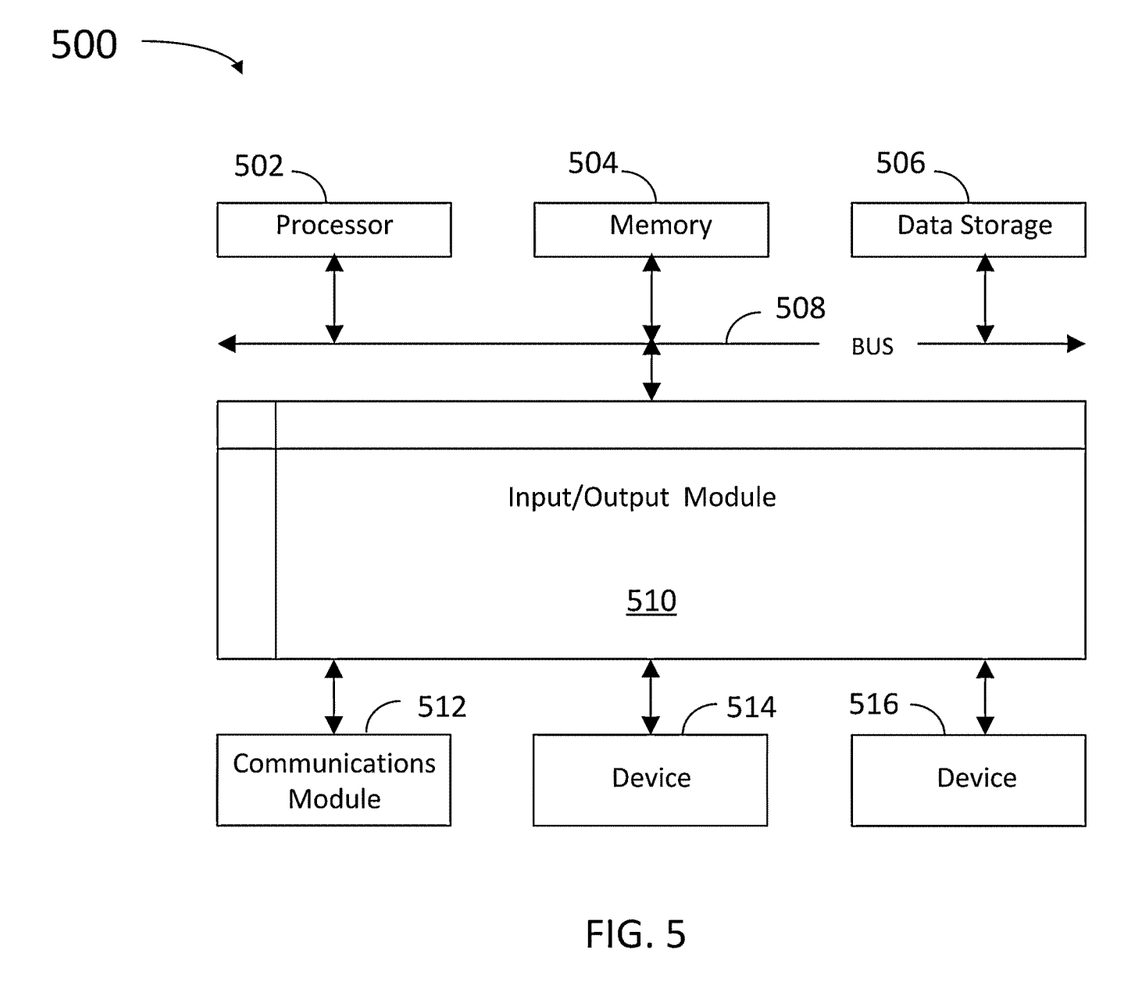
FIG. 5 is a block diagram illustrating a computer system configured to perform at least some of the steps in methods disclosed herein.

FIG. 5 is a block diagram illustrating an exemplary computer system 500 with which the devices of FIGS. 1-2 (e.g., mixed reality devices and headsets), and the method of FIG. 4 can be implemented. In certain aspects, the computer system 500 may be implemented using hardware or a combination of software and hardware, either in a dedicated server, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, a code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, a special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communication modules 512 include networking interface cards, such as Ethernet cards and modems. In certain aspects, input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, a headset can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communication modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship with each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples, and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for recording video in a wearable device, comprising:
   a barrel to provide mechanical support for one or more components in the system;
   a camera, disposed inside the barrel, wherein the camera includes a front lens with a camera field of view pointed to an onlooker outside of the wearable device;
   a cover glass mounted on the barrel, the cover glass configured to protect the front lens and one or more components in the system;
   a first light emitting device, disposed inside the barrel; and
   a light pipe inside the barrel configured to receive a light from the first light emitting device and to transmit the light through an overlap area on the cover glass and outside of the wearable device, to the onlooker, when the camera is recording a scene outside of the wearable device, within the camera field of view, wherein the camera field of view comprises at least a portion of the overlap area.

2. The system of claim 1, wherein the barrel has a cylindrical shape, further comprising at least a second light emitting device disposed diametrically opposed to the first light emitting device, inside the barrel.

3. The system of claim 1, wherein the light pipe includes a surface on a side adjacent to the camera, the surface coated to prevent the light from the first light emitting device to enter the camera field of view.

4. The system of claim 1, wherein the cover glass is coated to prevent a reflection of the light from the first light emitting device to enter the camera field of view.

5. The system of claim 1, wherein the camera further comprises a display configured to capture the scene in the camera field of view, and a processor configured to identify a blockage of the camera field of view within the portion of the overlap area.

6. The system of claim 1, wherein the front lens is further configured to focus on the overlap area to identify a blockage of the camera field of view.

7. The system of claim 1, wherein the overlap area has a size larger than a blockage detectability threshold, based on a thickness of the cover glass.

8. The system of claim 1, further comprising a processor configured to activate the first light emitting device when the camera starts recording a video of the onlooker outside of the wearable device.

9. The system of claim 1, further comprising a processor configured to stop a video of the onlooker outside of the wearable device when a blockage of the camera field of view within the portion of the overlap area is identified.

10. The system of claim 1, further comprising a processor and a memory storing instructions to cause the processor to identify, in an image collected by the camera, a blockage of the camera field of view, and to stop a video recording with the camera when the blockage of the camera field of view is identified.

11. A wearable device for use in immersive reality applications, comprising:
   a camera for recording a video of an onlooker, the camera having a front lens with a camera field of view pointed to the onlooker, and a display to capture the video of the onlooker;
   a recording indicator to provide a signal to the onlooker, the signal indicative that the video is being collected from the camera, the recording indicator comprising:
      a barrel to provide mechanical support to the camera;
      a cover glass mounted on the barrel, the cover glass configured to protect the front lens of the camera and the recording indicator;
      a first light emitting device disposed inside the barrel; and
      a light pipe inside the barrel and configured to receive a light from the first light emitting device and to transmit the light through an overlap area on the cover glass and outside of the wearable device, to the onlooker, when the camera is recording a scene outside of the wearable device, within the camera field of view, wherein the camera field of view comprises at least a portion of the overlap area; and a processor configured to identify a blockage of the camera field of view within the portion of the overlap area, and to stop recording the video when the blockage of the camera field of view is identified.

12. The wearable device of claim 11, further comprising a display configured to advise a user of the wearable device that the video has stopped, and to remove the blockage of the camera field of view.

13. The wearable device of claim 11, wherein the barrel has a cylindrical shape, further comprising at least a second light emitting device disposed diametrically opposed to the first light emitting device, inside the barrel.

14. The wearable device of claim 11, wherein the barrel has a cylindrical shape, and the first light emitting device is formed as a ring that abuts a bottom surface of the barrel.

15. The wearable device of claim 11, wherein the light pipe includes a surface on a side adjacent to the camera, the surface coated to prevent the light from the first light emitting device to enter the camera field of view.

16. The wearable device of claim 11, wherein the cover glass is coated to prevent a reflection of the light from the first light emitting device to enter the camera field of view.

17. The wearable device of claim 11, wherein the processor is configured to activate the first light emitting device when the camera starts recording a video of the onlooker outside of the wearable device.

18. The wearable device of claim 11, wherein the processor is configured to stop a video of the onlooker outside of the wearable device when a blockage of the camera field of view within the portion of the overlap area is identified.

19. The wearable device of claim 11, further comprising a memory storing instructions to cause the processor to identify, in an image collected by the camera, an artifact generated by an object blocking the cover glass within the overlap area.

20. The wearable device of claim 11, further comprising a memory storing instructions to cause the processor to identify, in an image collected by the camera, a blockage of the camera field of view, and to stop a video recording with the camera when the blockage of the camera field of view is identified.

* * * * *